(12) United States Patent
Morooka et al.

(10) Patent No.: US 7,474,429 B2
(45) Date of Patent: Jan. 6, 2009

(54) INFORMATION PROCESSING APPARATUS FOR CONTROLLING A PRINT JOB USING A VIRTUAL PRINTER

(75) Inventors: Hidekazu Morooka, Kanagawa (JP); Noriyoshi Kurotsu, Kanagawa (JP); Masamichi Ohshima, Tokyo (JP); Takashi Yagita, Kanagawa (JP); Koichiro Wanda, Kanagawa (JP); Koji Kikuchi, Kanagawa (JP); Kei Kitagata, Kanagawa (JP); Hiroyuki Kayama, Kanagawa (JP); Kenichi Shirai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 776 days.

(21) Appl. No.: 10/860,064

(22) Filed: Jun. 4, 2004

(65) Prior Publication Data
US 2004/0257604 A1 Dec. 23, 2004

(30) Foreign Application Priority Data
Jun. 17, 2003 (JP) .............................. 2003-172019

(51) Int. Cl.
*G06F 3/12* (2006.01)
*G06F 3/00* (2006.01)
*G06T 11/20* (2006.01)
(52) U.S. Cl. ...................... 358/1.15; 710/19; 345/440.2

(58) Field of Classification Search ................... 710/19; 345/440.2; 358/1.15
See application file for complete search history.

(56) References Cited

U.S. PATENT DOCUMENTS 6,275,987 B1 * 8/2001 Fraley et al. ................. 717/127
2003/0053129 A1 * 3/2003 Morooka et al. ........... 358/1.15
2003/0152902 A1 * 8/2003 Altenhofen et al. ......... 434/350

FOREIGN PATENT DOCUMENTS

JP 11-143661 5/1999

* cited by examiner

*Primary Examiner*—King Y Poon
*Assistant Examiner*—Fred Guillermety
(74) *Attorney, Agent, or Firm*—Fitzpatrick, Cella, Harper & Scinto

(57) ABSTRACT

To solve such a problem that it takes time to display a print setting display screen of a virtual printer to which functions of member printer drivers having different characteristics have been reflected, in an information processing apparatus for making job control of the virtual printer constructed by a plurality of member printers, a conflicting process based on each function of the plurality of member printers is executed, a construction of the member printers is examined in association with display control for reflecting a conflict result to a setting display screen of the virtual printer, and control is made to as to visualize an advance situation of the conflicting process on the basis of an examination result.

18 Claims, 17 Drawing Sheets

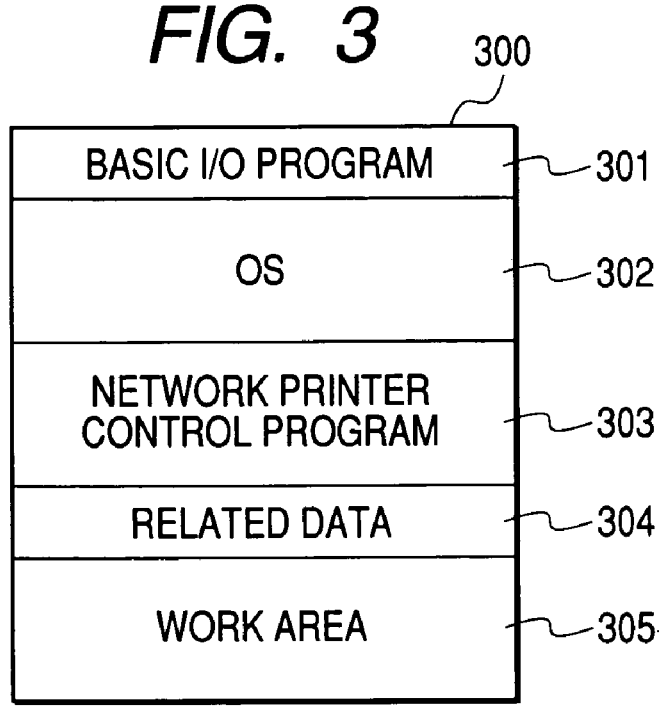
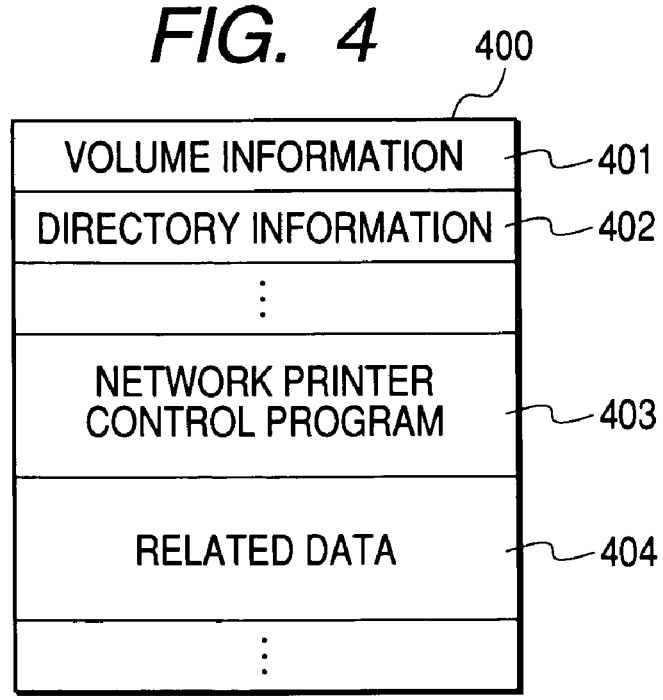

FIG. 15

| | SETTING ITEMS |
|---|---|
| COMMON SETTING ITEMS | LOGICAL SHEET SIZE<br>OUTPUT SHEET SIZE<br>USER DEFINED SHEET<br>ORIENTATION OF PRINTING<br>MARGIN<br>MAGNIFICATION<br>THE NUMBER OF COPIES<br>COPY UNIT (GROUP, COLLATE)<br>SORT (NON-COLLATE)<br>PAGE LAYOUT<br>LAYOUT ORDER<br>DOUBLE-SIDED/SIMPLEX<br>RESOLUTION<br>GRAY SCALE |
| EXPANSION SETTING ITEMS | ROTATION<br>WATERMARK<br>PAGE OPTION<br>BINDING DIRECTION<br>BINDING MARGIN<br>STAPLE<br>STAPLING POSITION<br>SADDLE (BOOKLET PRINTING)<br>SADDLE MAX. NUMBER OF SHEETS |
| | METHOD OF BOOKLET PRINTING<br>OPENING DIRECTION<br>BOOKLET BINDING MARGIN<br>MIN. VALUE OF BOOKLET BINDING MARGIN |
| | PUNCH<br>Z-FOLDING<br>4-POSTCARD<br>SHEET MIXTURE<br>INSERTER<br>PAPER FEEDING METHOD<br>PAPER FEEDING UNIT |

FIG. 16A

| FUNCTION | PRINTER DRIVER B | PRINTER DRIVER C | PRINTER DRIVER D | PRINTER DRIVER A |
|---|---|---|---|---|
| BOOKLET PRINTING FUNCTION | YES | NO | YES | NO |
| STAPLING FUNCTION | YES | YES | YES | YES |
| PUNCHING FUNCTION | NO | NO | NO | NO |

FIG. 16B

| CONSTRUCTION OF THE MEMBER PRINTER | SETTABLE ITEMS |
|---|---|
| INCLUDING FUNCTION-UNCONTROLLABLE DRIVERS | COMMON SETTING ITEMS |
| ONLY FUNCTION-CONTROLLABLE DRIVERS | COMMON SETTING ITEMS + EXPANSION SETTING ITEMS |

FIG. 16C

| CONSTRUCTION OF THE MEMBER PRINTER | SETTABLE ITEMS |
|---|---|
| WHEN ALL PRINTERS ARE FUNCTION-UNCONTROLLABLE | COMMON SETTING ITEMS |
| WHEN AT LEAST ONE FUNCTION-CONTROLLABLE PRINTER IS INCLUDED | COMMON SETTING ITEMS + EXPANSION SETTING ITEMS |

INFORMATION PROCESSING APPARATUS FOR CONTROLLING A PRINT JOB USING A VIRTUAL PRINTER

BACKGROUND OF THE INVENTION

1. Field of the Invention

The invention relates to a mechanism of a virtual printer which is used upon distribution printing or broadcast printing.

2. Related Background Art

Hitherto, there has been known such a mechanism that an EMF (Enhanced Meta-File) formed from application data and a job description file formed on the basis of settings through a virtual driver (virtual printer) are prepared, an EMF-converted command is transmitted to a printer on the distribution destination side of a job included in the job description file, and distribution printing is executed.

For example, in Japanese Patent Application Laid-Open No. 11-143661, there has been disclosed such a mechanism that in the printing using the virtual driver as mentioned above, common information (sheet size, sheet type, etc.) which has been set through a dialog display screen of the virtual driver and does not depend on a manufacturer or a printer type is print-set as DEVMODE information.

Settable items on the dialog display screen of the virtual driver are fixed and represent a plurality of printers which are used for the distribution printing. According to the distribution printing, the user can obtain such an advantage that predetermined settings can be collectively made for a plurality of printers upon distribution printing or the like.

However, according to the technique of Japanese Patent Application Laid-Open No. 11-143661 which has conventionally been known, since the items which can be set through the dialog display screen of the virtual driver are fixed and functions of the plurality of printers are handled as uniform functions, there is such a problem that, actually, the different functions of the printers are not reflected to the settings of a virtual printer enough and the functions of the printers cannot be used effectively enough.

To solve such a problem, it is desirable to use such a construction that the functions of the actual printers constructing the virtual printer are obtained, print setting items without a contradiction are specified into each printer on the basis of the obtained information, and the specified print setting items are reflected to the dialog display screen of the virtual printer.

However, according to the technique of Japanese Patent Application Laid-Open No. 11-143661 which has conventionally been known, a process for obtaining the functions of the printers, and the like, for fully utilizing the functions of the printers are not presumed and the mechanism which simply displays the dialog display screen of the virtual driver has been disclosed. There is, consequently, such a problem that when it takes a few to tens of seconds to form the dialog display screen of the virtual driver, the user will feel anxious. Depending on a case, there is also a fear that the user misthinks that a print processing apparatus (personal computer or the like) has been frozen and reactivates the print processing apparatus.

The invention is made in consideration of the above problems and it is an object of the invention to provide such a mechanism that a virtual printer setting display screen to which functions of a plurality of actual printers corresponding to a virtual printer have been reflected can be provided to the user without giving him anxiety.

SUMMARY OF THE INVENTION

Accordingly, the present invention is conceived as a response to the above-described disadvantages of the conventional art.

According to one aspect of the present invention, preferably, there is provided a mechanism regarding job control of a virtual printer constructed by a plurality of member printers, comprising: conflicting means for executing a conflicting process based on each function of the plurality of member printers; display control means for reflecting a result of the conflicting process by the conflicting means to a setting display screen of the virtual printer; and examining means for examining a construction of the member printers, wherein the display control means controls so as to visualize an advance situation of the conflicting process on the basis of the examination by the examining means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 shows an example of a memory map in a RAM 202 shown in FIG. 2;

FIG. 4 shows an example of a memory map in an FD 204 shown in FIG. 2;

FIG. 15 is a diagram showing a correspondence among common setting items, expansion setting items, and setting items;

FIGS. 16A, 16B, and 16C are diagrams for explaining contents of the conflicting process;

DETAILED DESCRIPTION OF THE PREFERRED EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Preferred embodiments to which the invention is applied will be described hereinbelow.

Figure 1:
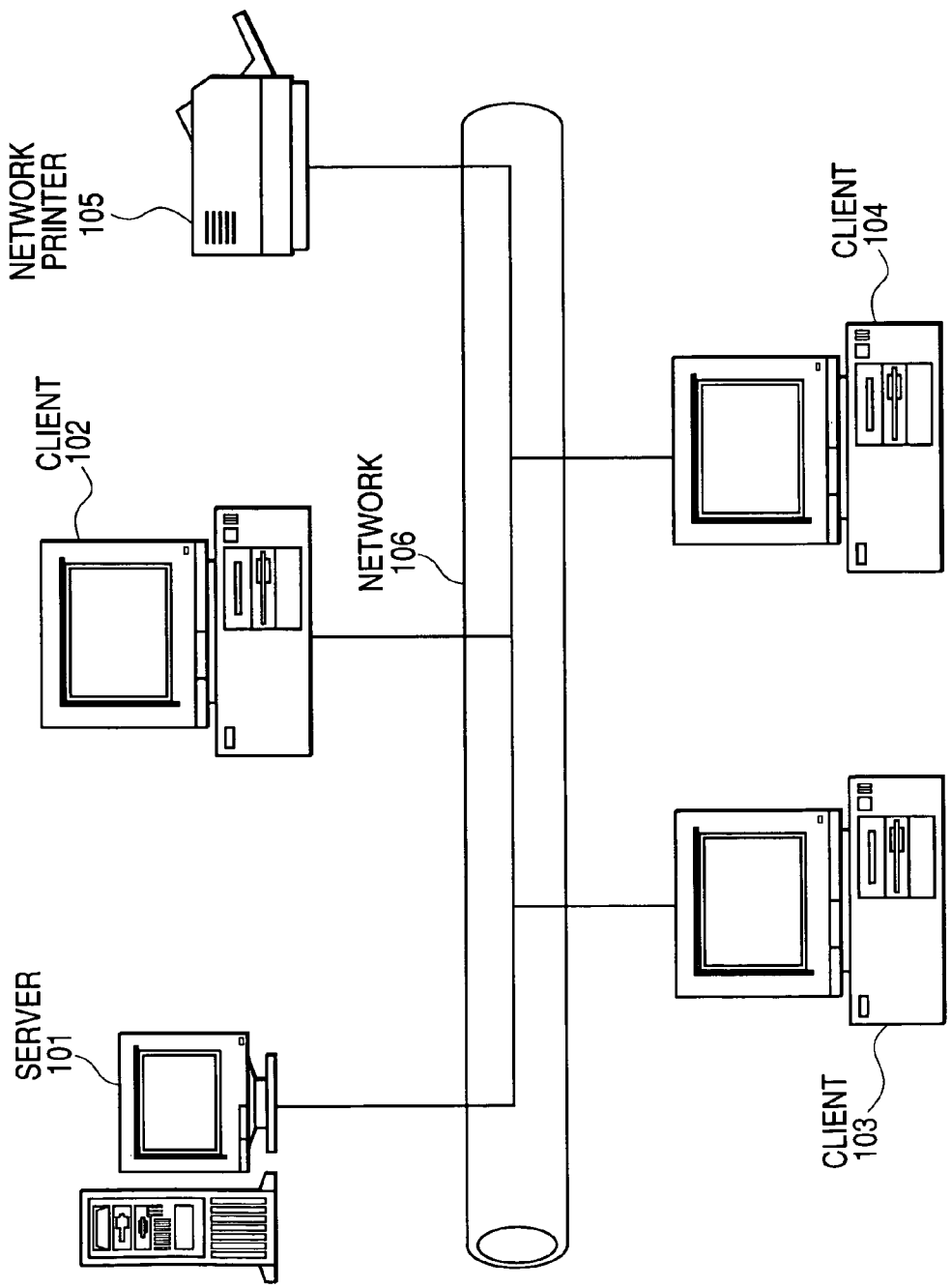
FIG. 1 is a block diagram for explaining a construction of an information processing system to which the invention can be applied.

FIG. 1 is a block diagram for explaining a construction of an information processing system to which the invention can be applied. It is presumed that one or a plurality of client computers in the present system are connected.

In the diagram, reference numerals 102, 103, and 104 denote information processing apparatuses serving as client computers (also referred to as clients) which are connected to a network 106 by a network cable such as Ethernet (registered trademark) or the like. Each of the client computers 102 to 104 can execute various programs such as an application program and the like and has a printer driver having a function for converting print data into a printer language which corresponds to a printer or can be interpreted. As will be explained in detail hereinafter, it is assumed that the printer driver in the invention supports a plurality of printer drivers.

Reference numeral 101 denotes an information processing apparatus serving as a server (hereinafter, referred to as a print server) in the embodiment which is connected to the network 106 by the network cable. The print server 101 accumulates files which are used on the network or monitors a using state of the network 106. The print server 101 has a function for managing a plurality of printers connected to the network 106.

As a construction, the clients 102 to 104 and the print server 101 are the general information processing apparatuses and print control programs for making different controls have been stored in the clients and the print server so that they can be executed, respectively.

The print server 101 is the general information processing apparatus and can also have the functions of the clients 102 to 104.

The print server 101 in the embodiment further has the following functions: that is, a print job including the print data whose print request has been made by the client computers 102 to 104 is stored and printing is performed, or only job information including no print data is received from the client computers 102 to 104, print order at the time of sending the print data to the printers of the client computers 102 to 104 is managed, the client whose turn has come is notified of a transmission permission of the print job including the print data, various information of a status and a print job of a network printer 105 is obtained, and the client computers 102 to 104 are notified of such information.

Reference numeral 105 denotes the network printer as a print control apparatus which is connected to the network 106 through a network interface (not shown). The network printer 105 analyzes the print job including the print data that is transmitted from the client computer or the print server 101, converts it into a dot image, and prints it every page. Reference numeral 106 denotes the network which connects the client computers 102 to 104, the server 101, the network printer 105, and the like so that they can communicate with each other.

Figure 2:
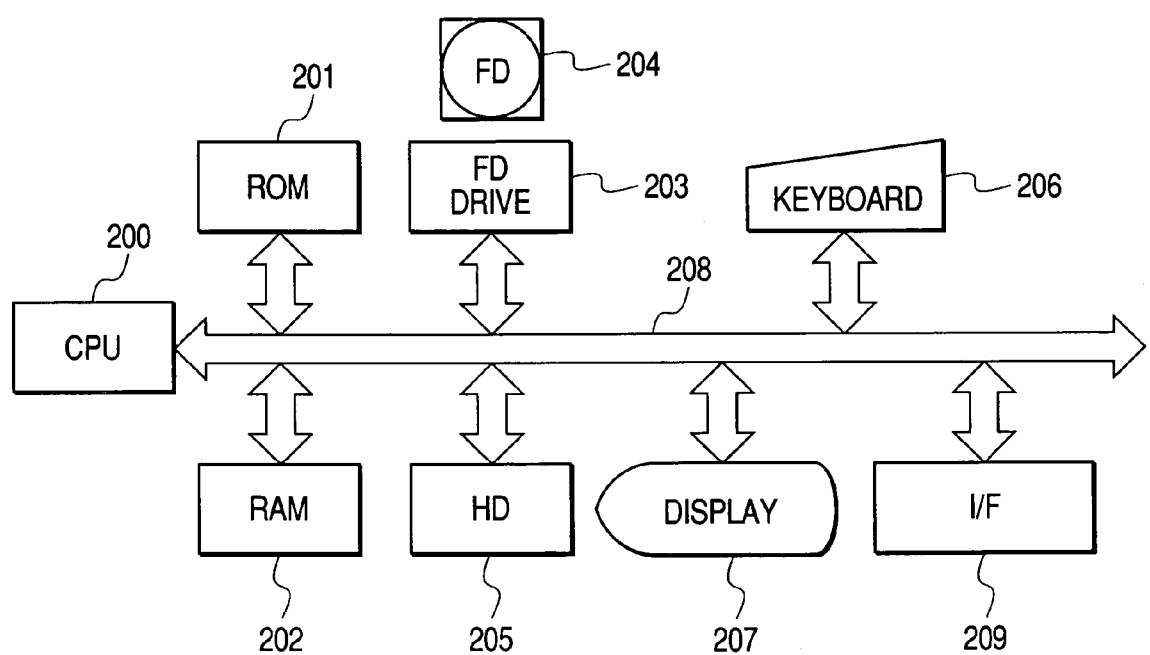
FIG. 2 is a block diagram for explaining a construction of an information processing apparatus of the invention.

FIG. 2 is a block diagram for explaining a construction of the information processing apparatus of the invention. It is assumed that the client computers 102 to 104 as information processing apparatuses have the same construction and, further, the server 101 also has a similar to equivalent hardware construction. Therefore, FIG. 2 will be explained as a block diagram for explaining a construction of each of the clients and the server.

In FIG. 2, reference numeral 200 denotes a CPU serving as control means of the information processing apparatus. The CPU 200 makes control for executing an application program, a printer driver program, and an OS stored in a hard disk (HD) 205, a network printer control program of the invention, or the like and temporarily storing information, files, and the like necessary for execution of the programs into a RAM 202.

Reference numeral 201 denotes a ROM serving as storing means. A program such as a basic I/O program or the like and various data such as font data, template data, and the like which are used upon document processing are stored in the ROM 201. Reference numeral 202 denotes a RAM serving as temporary storing means. The RAM 202 functions as a main memory, a work area, or the like of the CPU 200.

Figure 5:
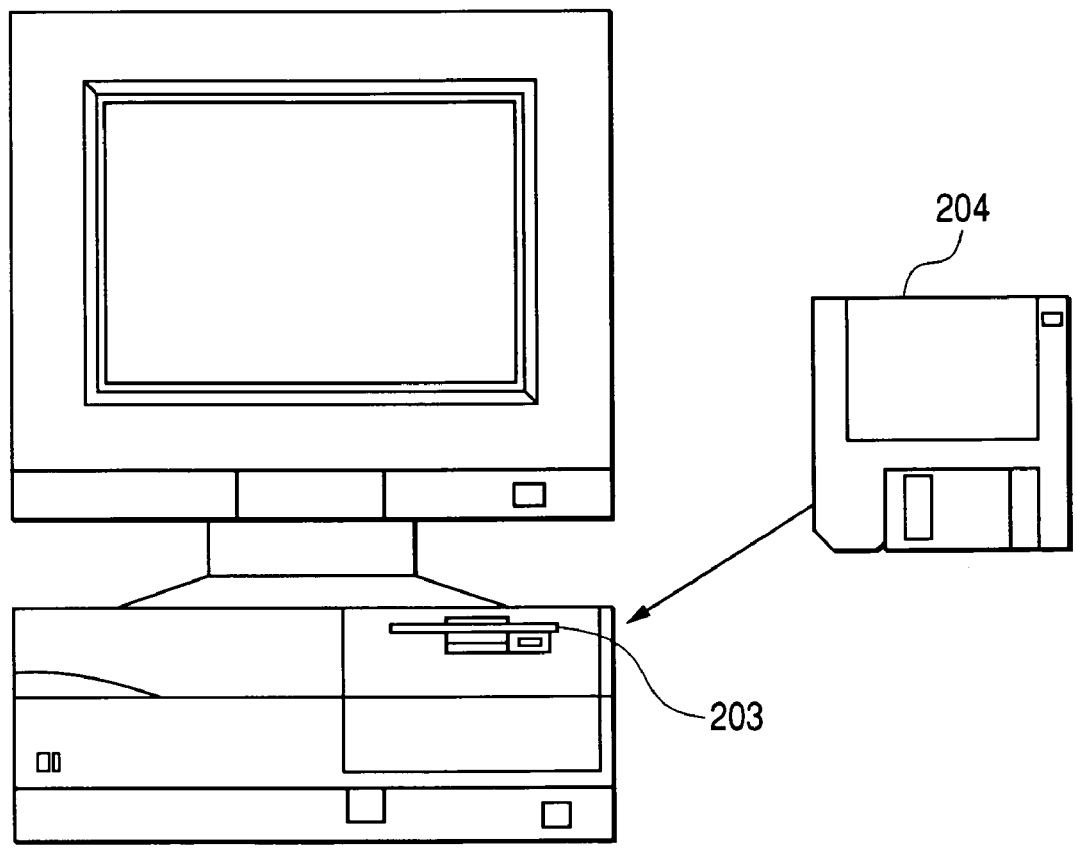
FIG. 5 is a diagram showing a relation with the FD 204 which is inserted into an FD drive 203 shown in FIG. 2.

Reference numeral 203 denotes a floppy (registered trademark) disk (FD) drive serving as storing medium reading means. A program or the like stored in a floppy disk (FD) 204 serving as a storing medium can be loaded into the computer system through the FD drive 203 as shown in FIG. 5, which will be explained hereinafter. The storing medium is not limited to the FD but an arbitrary one of a CD-ROM, a CD-R, a CD-RW, a PC card, a DVD, an IC memory card, an MO, a memory stick, and the like can be used.

Reference numeral 204 denotes the floppy disk (FD) 204 serving as a storing medium in which a computer-readable program has been stored.

Reference numeral 205 denotes the hard disk (HD) which is one of external storing means and functions as a memory of a large capacity. The application program, the printer driver program, the OS, a network printer control program, a related program, and the like have been stored in the HD 205. Further, a spooler as spooling means is held here. The spooling means is a client spooler in the case of the client and is a server spooler in the case of the print server. In the print server, the job information received from the client is stored and a table for making the order control is also formed and stored in the external storing means.

Reference numeral 206 denotes a keyboard serving as instruction input means. By using this keyboard, the user instructs the client computer to input a command such as a control command or the like of the device, or the operator or the administrator instructs the print server to input such a command.

Reference numeral 207 denotes a display serving as display means for displaying the command inputted from the keyboard 206, a status of the printer, or the like.

Reference numeral 208 denotes a system bus for transmitting data in the computer as a client or a print server.

Reference numeral 209 denotes an interface (I/F) serving as input/output means. The information processing apparatus transmits and receives data to/from an external apparatus through the I/F 209.

FIG. 3 is a diagram showing an example of a memory map in the RAM 202 shown in FIG. 2. FIG. 3 shows the memory map in the state where the network printer control program which is loaded from the FD 204 has been loaded into the RAM 202 and can be executed.

In the embodiment, an example in which the network printer control program and the related data are directly loaded from the FD 204 into the RAM 202 and executed is shown. However, as another example, it is also possible to construct in such a manner that each time the network printer control program is made operative from the FD 204, they are loaded into the RAM 202 from the HD 205 in which the network printer control program has already been installed.

The medium for storing the network printer control program is not limited to the FD but another medium such as CD-ROM, CD-R, PC card, DVD, IC memory card, or the like can be used so long as it can store information. Further, it is also possible to construct in such a manner that the network printer control program is stored into the ROM 201, used as a part of the memory map, and directly executed by the CPU 200.

Software for realizing functions which are equivalent to those of the foregoing apparatuses can be also substituted for the hardware apparatuses.

The network printer control program is also simply called a print control program. The print control program includes a program for allowing the client to make control so as to instruct a change in print destination of the print job or a change in print order. The print control program includes a program for allowing the print server to control the order of the print jobs and notify of a print end of the print job, a request for changing the print destination, or the like. The print control program of the invention for making such control can be divided into a module which is installed into the client and a module which is installed into the print server or it is also possible to construct in such a manner that one print control program functions as a program for the client or a program for the print server in accordance with an environment where it is executed. Or, it is also possible to construct in such a manner that both of the module having the function for the client and the module having the function for the print server are installed into one computer and they are simultaneously operated or falsely operated in parallel in a time-sharing manner.

Reference numeral 301 denotes a basic I/O program serving as an area where such a program having an IPL (Initial Program Loading) function or the like that when a power source of the control apparatus is turned on, the OS is read out from the HD 205 and stored into the RAM 202, and the operation of the OS is started has been stored.

Reference numeral 302 denotes an operating system (OS); 303 a network printer control program which is stored in an area held in the RAM 202; 304 related data which is stored in an area held in the RAM 202; and 305 a work area where an area for making the CPU 200 execute the printer control program is held.

FIG. 4 is a diagram showing an example of a memory map in the FD 204 shown in FIG. 2.

In FIG. 4, reference numeral 400 denotes data contents in the FD 204; 401 volume information showing information of the data; 402 directory information; 403 a network printer control program as print control program, which will be explained in the embodiment; and 404 its related data. The network printer control program 403 is a program obtained on the basis of flowcharts, which will be explained in the embodiment. In the embodiment, each of the clients and the server has a similar construction.

FIG. 5 is a diagram showing a relation with the FD 204 which is inserted into the FD drive 203 shown in FIG. 2 and the same component elements as those in FIG. 2 are designated by the same reference numerals.

In FIG. 5, the network printer control program and the related data, which will be explained in the embodiment, have been stored in the FD 204.

A print job control system for executing a printing process such as distribution, broadcasting, or proxy mentioned above by using a plurality of printers in the embodiment will now be described.

In the embodiment, a plurality of printers which are virtually assembled as one printer is called a group printer and the printers which are assembled are called member printers. The printer drivers corresponding to those plurality of printers are called a group printer driver and the printers which are assembled are called member printer drivers, respectively.

Figure 6:
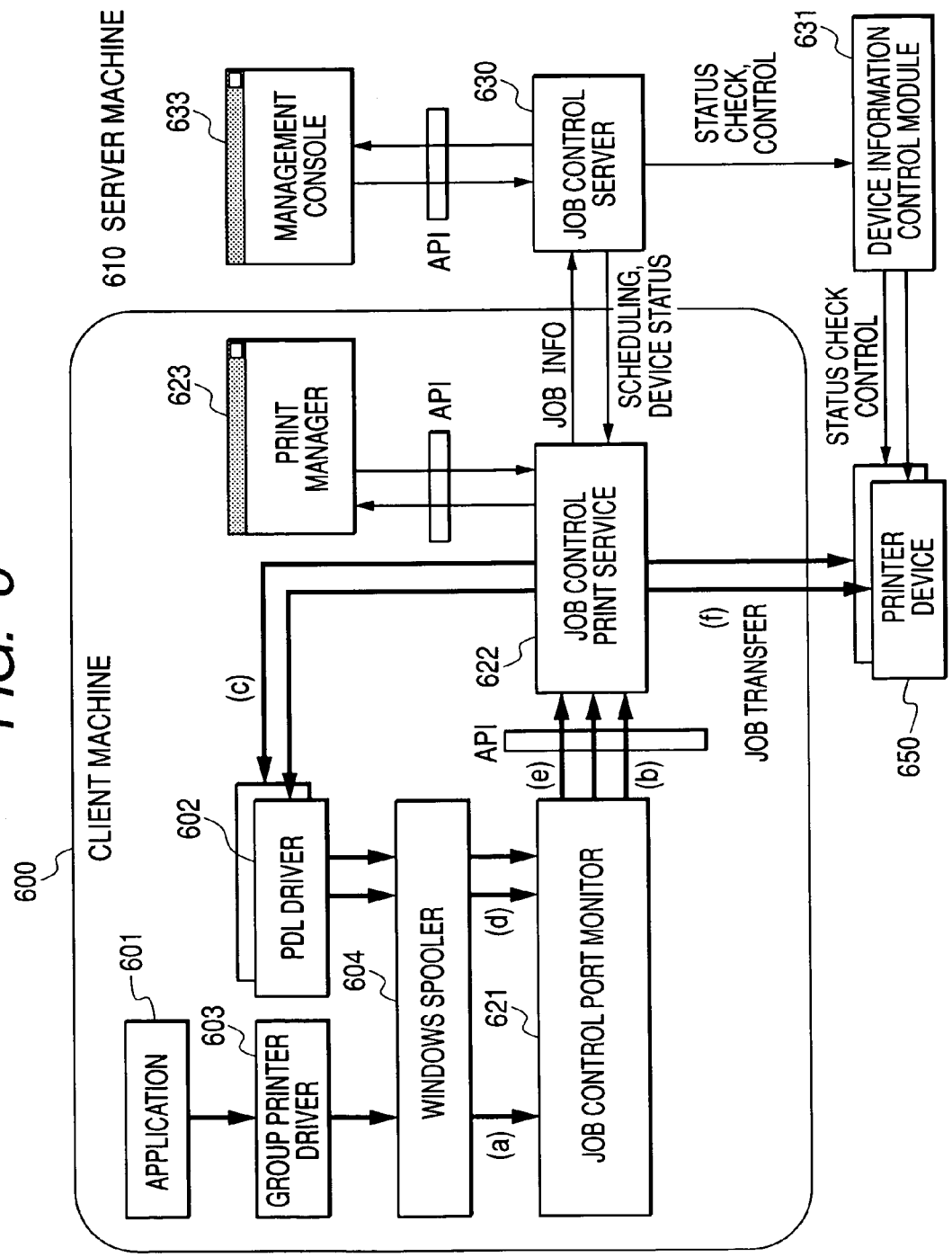
FIG. 6 is a block diagram for explaining a construction of a print control module of the information processing apparatus of the invention.

FIG. 6 is a block diagram showing how the print job issued from the general application such as "Microsoft Word (registered trademark)" is processed in the print job control system in the client server model of the present system. In FIG. 6, reference numeral 600 denotes a client machine in which a client module of the print job control system operates.

Ordinarily, when the printing is instructed, the application program generates a series of draw commands and sends them to the Windows Spooler through the printer driver. The Windows Spooler executes a procedure for sending the print job data to a port monitor selected by the user, thereby transmitting it to the printer device.

In the embodiment, the user previously designates a port monitor 621 for the print job control system (hereinbelow, this monitor is abbreviated to a job control port monitor in the embodiment) and instructs the printing. An application program 601 forms a series of draw commands. A group printer driver 603 which received the draw command forms a general print file and transmits it as print job data to the job control port monitor 621 instead of a port monitor which transmits the print job data to the printer device. The job control port monitor 621 transmits the print job data to a print service 622 for the print job control system (hereinbelow, this service is abbreviated to a job control print service in the embodiment) instead of a printer device 650. The job control print service 622 executes a print job control process as will be explained hereinafter to the print job data.

A print manager 623 for the print job control system (hereinbelow, this manager is abbreviated to a job control print manager in the embodiment) is a program for providing a user interface (UI) which is used by the user to examine in which status the print job in the job control print service 622 is or to operate the print job.

The job control print manager 623 transmits and receives information and an instruction to/from the job control print service 622 through an interface (API) of software of the job control print service 622.

A server 630 for the print job control system (hereinbelow, this server is abbreviated to a job control server in the embodiment) concentratedly controls (scheduling) timing when the job control print service 622 on each client 600 transmits the print job to the printer device 650.

A management console 633 for the print job control system (hereinbelow, this console is abbreviated to a job control management console in the embodiment) can monitor the whole print job control system by transmitting and receiving information and an instruction to/from the job control server 630 through an API to which software of the job control server 630 accesses.

The job control server 630 communicates with each printer device 650 by using a device information control module 631, obtains information regarding the print job and an operating mode in each printer, and operates. The obtained information can be transferred to the job control print service 622 on the client 600 side.

The printing by the group printer driver 603 in the embodiment will now be described.

The group printer driver 603 converts the series of draw commands formed by the application program into a general print file as a file in an intermediate format which does not depend on a type of printer device, OS, or the like. A construction of the general print file will be described hereinafter.

As mentioned above, the general print file is transferred from a Windows spooler 604 through the job control port monitor 621 (a) to the job control print service 622 (b). The job control print service 622 forms a draw command (c) on the basis of the general print file in accordance with the type of job control which is made to the print job. Subsequently, a PDL driver 602 converts the draw command into a PDL file which can be interpreted by the printer device 650. FIG. 6 shows an example in which job control to divide the print job into two jobs is made to the print job by the job control print service 622. An example in which two member jobs have been formed is shown by two arrows (c). The PDL file formed by the PDL driver 602 is transferred again from the Windows spooler 604 through the job control port monitor 621 (d) to the job control print service 622 (e). The job control print service 622 transmits the print job data of the PDL to the printer device 650 (f) in accordance with an instruction of the job control server 630.

In accordance with an instruction of a print instruction manual in the general print file, the job control print service 622 logically divides one general print file into a plurality of print jobs and transmits them to different printer devices, or transmits again the print job data which has once been transmitted to another printer device. (c), (d), (e), and (f) in FIG. 6 indicate a path of the print job data in such a case.

In the case where the application software forms the general print file and the application software directly inputs the general print file as a print job, a method of transferring the information to the group printer driver 603 and processing contents in the group printer driver 603 are different from those of the general application. As mentioned above, in the case of the general application, when the application transfers the drawing information to the group printer driver 603, a GDI function of Windows is called in a manner similar to that in the ordinary printer driver and the group printer driver 603 forms the general print file in accordance with the GDI function. On the other hand, in the case of the application which directly forms the general print file, the application has already had the general print file and supplies it to the group printer driver 603. The group printer driver 603 rewrites the print instruction manual in the general print file on the basis of a preset printing method as necessary and sends it to the Windows spooler 604.

Figure 8:
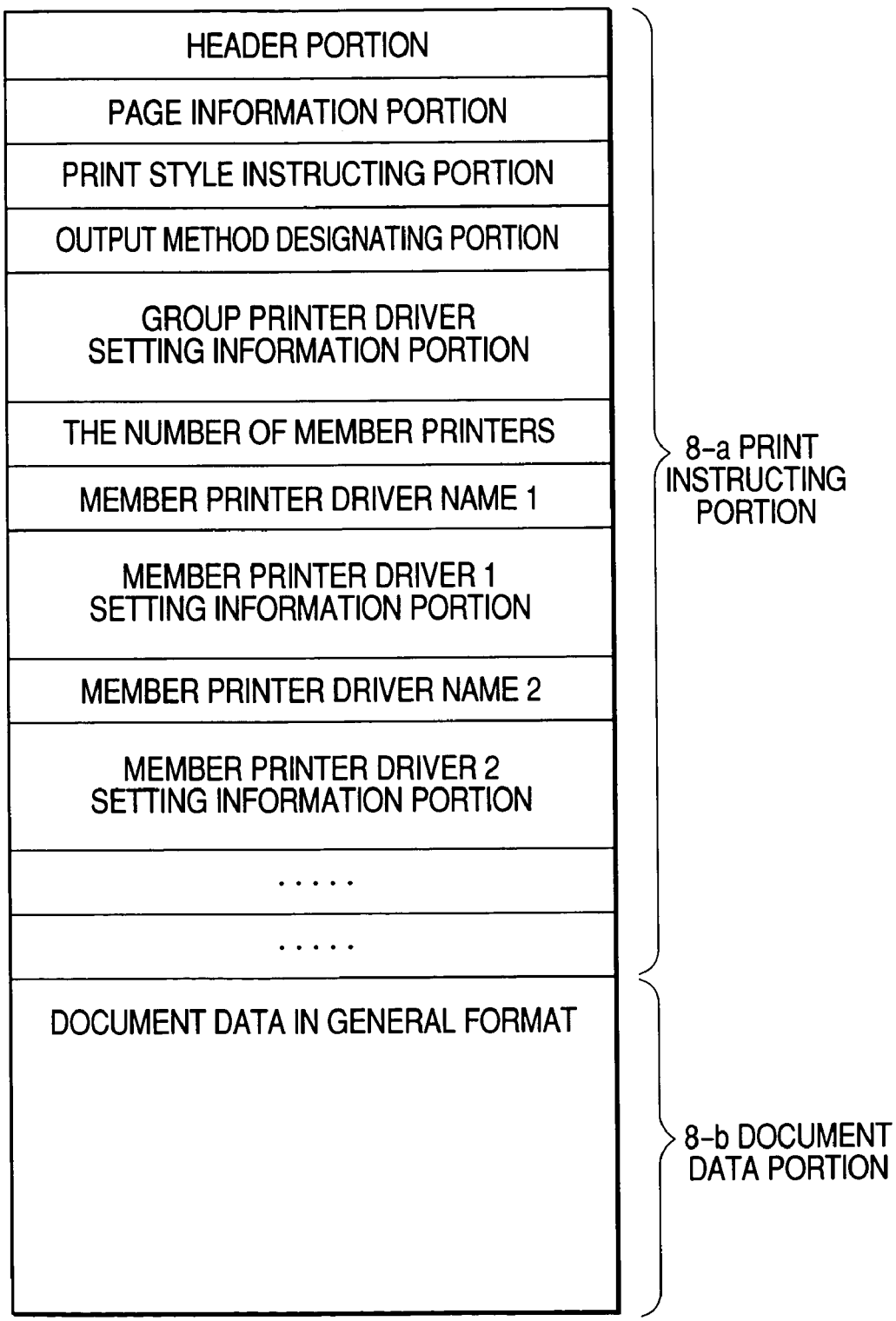
FIG. 8 is a diagram showing an example of a structure of a general print file.

FIG. 8 is a diagram showing an example of a structure of the general print file.

The general print file which is used in the embodiment comprises a print instructing portion 8-*a* and a document data portion 8-*b*. The print instructing portion is a portion describing information of a document and a print instruction. The document data is obtained by converting data of a document of the application into data in a general format such as PDF (registered trademark of Adobe Systems Inc.) or the like and has a data format which does not depend on a printer language.

The print instructing portion is constructed by: a header portion; a page information portion; a print style instructing portion; an output method designating portion; a group printer driver setting information portion; the number of member printers; a member printer driver name; a member printer driver setting information portion; and the like.

The header portion is a portion to store information regarding a version identification, file information, and the like of the file.

The page information portion is a portion to store information regarding the number of pages of the document data in the document data portion 8-*b*, a size of each page, and the like.

The print style instructing portion is a portion to store information regarding an output style such as range of a print page, the number of print copies, layout information (Nup, booklet printing, and the like) of the document data, stapling instruction, punching instruction, and the like.

The output method designating portion is a portion to store information, as an output method, regarding distribution printing, color/monochromatic distribution printing, proxy printing, broadcast printing, and the like.

The group printer driver setting information portion is a portion to store setting information of a UI of a group printer driver, which will be explained hereinafter.

The number of member printers is a portion to store the number of member printers associated with the group printer drivers.

The member printer driver name is a portion to store the name of the printer driver of the member printer.

The member printer driver setting information portion is a portion to store, for example, DEVMODE information as setting information of the driver UI of the member printer.

Each of the member printer driver name and the member printer driver setting information portion has storing areas of the number as many as the number of printers stored in the area of the number of member printers mentioned above.

In the group printer driver 603 described in FIG. 6 mentioned above, when the general print file is formed, the settings on the group printer driver GUI are recorded into the document data portion 8-*b*. Further, the group printer driver 603 converts the data received by the GDI into general data and records it as document data into the document data portion of the general print file.

This file can be a file in which the print instructing portion 8-*a* and the document data portion 8-*b* differ. In such a case, the print instructing portion exists as a print instruction manual file and the document data portion exists as a document data file and they can be collected in one archive format and similarly handled like one file.

A relation between a print system which is provided by Windows and the print job in a print job control system and an outline of processes will now be described further in detail with reference to FIG. 7.

Figure 7:
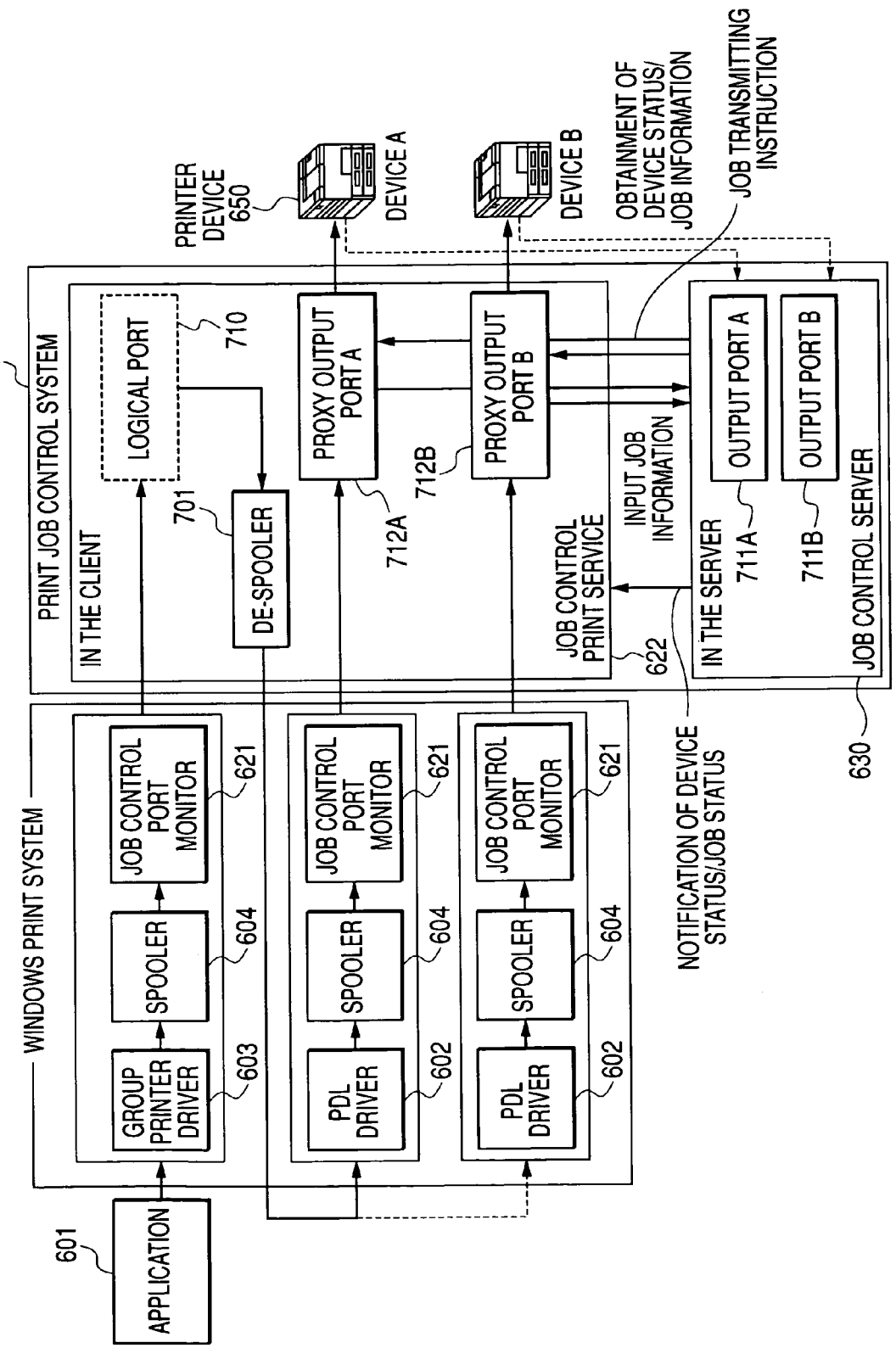
FIG. 7 is a block diagram for explaining a relation between a Windows print system and a print job in a print job control system according to the invention.

In FIG. 7, a print job control system 700 shows a range of the print job control system which extends over physical machines in which the control programs of the server and the client operate. An output port 711 (711A, 711B) which is managed by the server is associated with a proxy output port 712 (712A, 712B) of the job control print service 622 of the client and integratedly manages all proxy output ports on each client associated with one port. In the embodiment, the actual print job data is held in the proxy output port 712 of each client. The job control server 630 does not executes a transmitting process of the print job data itself but execute only a transmitting instruction of the print job to the job control print service 622. In response to such an instruction, the job control print service 622 of the client transmits the print job data to the device 650.

Processes in the case where the print job control system 700 executes additional valuable printing such as proxy printing, distribution printing, broadcast printing, or the like will now be described.

When the print job control system 700 executes the additional valuable printing such as proxy printing, distribution printing, broadcast printing, or the like, as mentioned above, the user or the application 601 has to issue the print job to the printer to which the group printer driver 603 has been allocated. The job control print service 622 receives the job data processed by the group printer driver 603 as a general print file through the job control port monitor 621. The job control print service 622 receives this job and issues the job (member job) to another printer to which the PDL driver has been allocated through a despooler 701, thereby making this printer execute the printing. At this time, the despooler 701 interprets the print instructing portion 8-*a* of the general print file described in FIG. 8 mentioned above, processes the document data in the document data portion 8-*b*, converts it into the GDI of Windows, instructs each printer driver to print, and issues the print job. For example, when an instruction of a 2up-layout has been recorded in the print style instructing portion, the document data of two pages is reduced and printed onto one sheet of paper. In the case of the distribution printing or the broadcast printing, the job is issued to a plurality of member printers described in the print instructing portion 8-*a* in accordance with those settings. In the case of the proxy printing, when proxy conditions are satisfied, the member job is issued in accordance with the previous settings at the time of the automatic proxy and issued in accordance with the operation of the user at the time of the manual proxy.

When the job is issued to each member printer, the despooler 701 needs to form DEVMODE of each member printer as a print instruction corresponding to the member printer driver. This DEVMODE is formed by properly reflecting the contents disclosed in the print instructing portion 8-*a* to DEVMODE of each member printer.

The job control print service 622 on the client side receives the PDL data of each member job which has been rendered by the PDL driver 602 through the job control port monitor 621, notifies the server side of the information regarding the received job, and temporarily holds the job data by its own proxy output port 712. Subsequently, after the job control print service 622 received the transmitting instruction from the job control server 630, it transmits the job data to the printer device 650.

Figure 9:
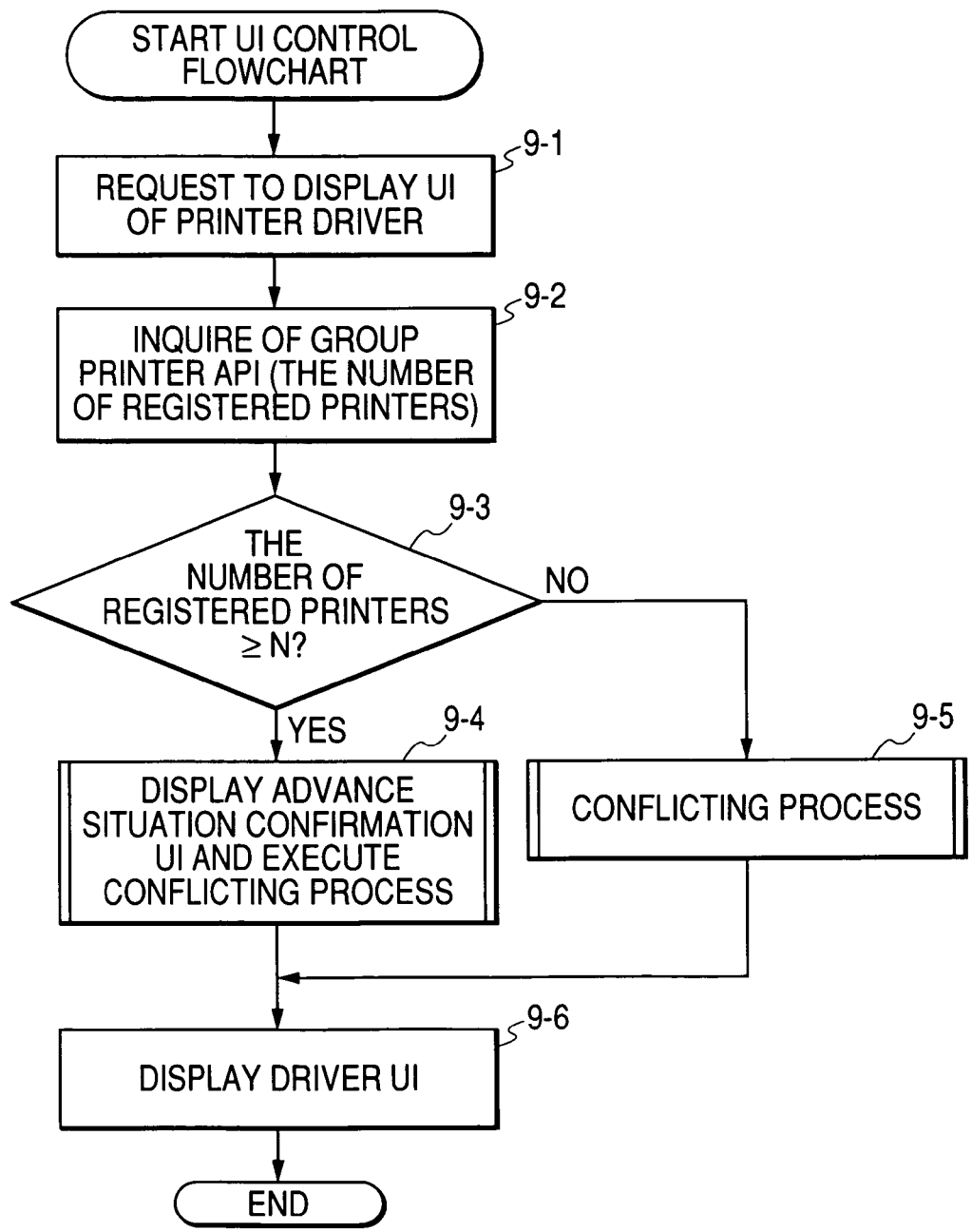
FIG. 9 is a basic flowchart for display of a group member printer driver UI.

FIG. 9 is a flowchart showing a UI control flow of the group printer driver of the invention. It is assumed that processes in steps in the flowchart of FIG. 9 are realized when a CPU (Central Processing Unit) provided for the information processing apparatus described above reads out a control program stored in a predetermined storing medium such as ROM, FD, hard disk (HD), or the like and executes the processes based on the read-out program.

In a mechanism regarding a virtual printer constructed by a plurality of member printers, in the case of making such display control that a conflict result by the conflicting means for executing the conflicting process based on each function of the plurality of member printers is reflected to a setting display screen of the virtual printer, a mechanism for controlling so that a construction of the member printers is examined and display control means visualizes an advance situation of the conflicting process on the basis of an examination result by examining means will be described hereinbelow.

First, when a UI displaying request is made by the application to the group printer driver through the OS, the processing routine advances to step 9-1.

In step 9-2, the number of member printers constructing the group printer is obtained by using a print job control system API. Generally, a plurality of kinds of group printers (virtual printers) are provided for the client PC and there is a possibility that the constructions of the member printers are different every group printer. In step 9-2, the number of member printers is examined as constructing information of the member printers corresponding to the group printer which has presently been selected.

A process for inquiring about identifications IDs of the member printer drivers constructing the group printer is also included in the process in step 9-2. The number of constructing member printers can be also calculated from the number of IDs by using the obtained identification ID of each member printer driver. The identifications IDs of the member printer drivers obtained in step 9-2 are used in FIG. 11, which will be explained hereinafter.

In step 9-3, the number of constructing member printers obtained in step 9-2 is compared with the number of printers which has previously been registered in the program as the advance situation confirmation UI display discrimination number of printers. If the number of member printers constructing the group printer is equal to or larger than the advance situation confirmation UI display discrimination number of printers, step 9-4 follows. If NO, step 9-5 follows. The construction of the member printers is unique every predetermined virtual printer. The member printers can be deleted, changed, or added by the user operation or the like. The flowchart of FIG. 9 shows the processes for making the advance situation confirmation UI display control adapted to the member printer construction which can be dynamically changed as mentioned above.

In step 9-6, display control to reflect the result of the conflicting process based on each function of a plurality of member printers executed in step 9-4 or 9-5 to the setting display screen of the group printer driver (print setting display screen of the virtual printer) is made.

Figure 10:
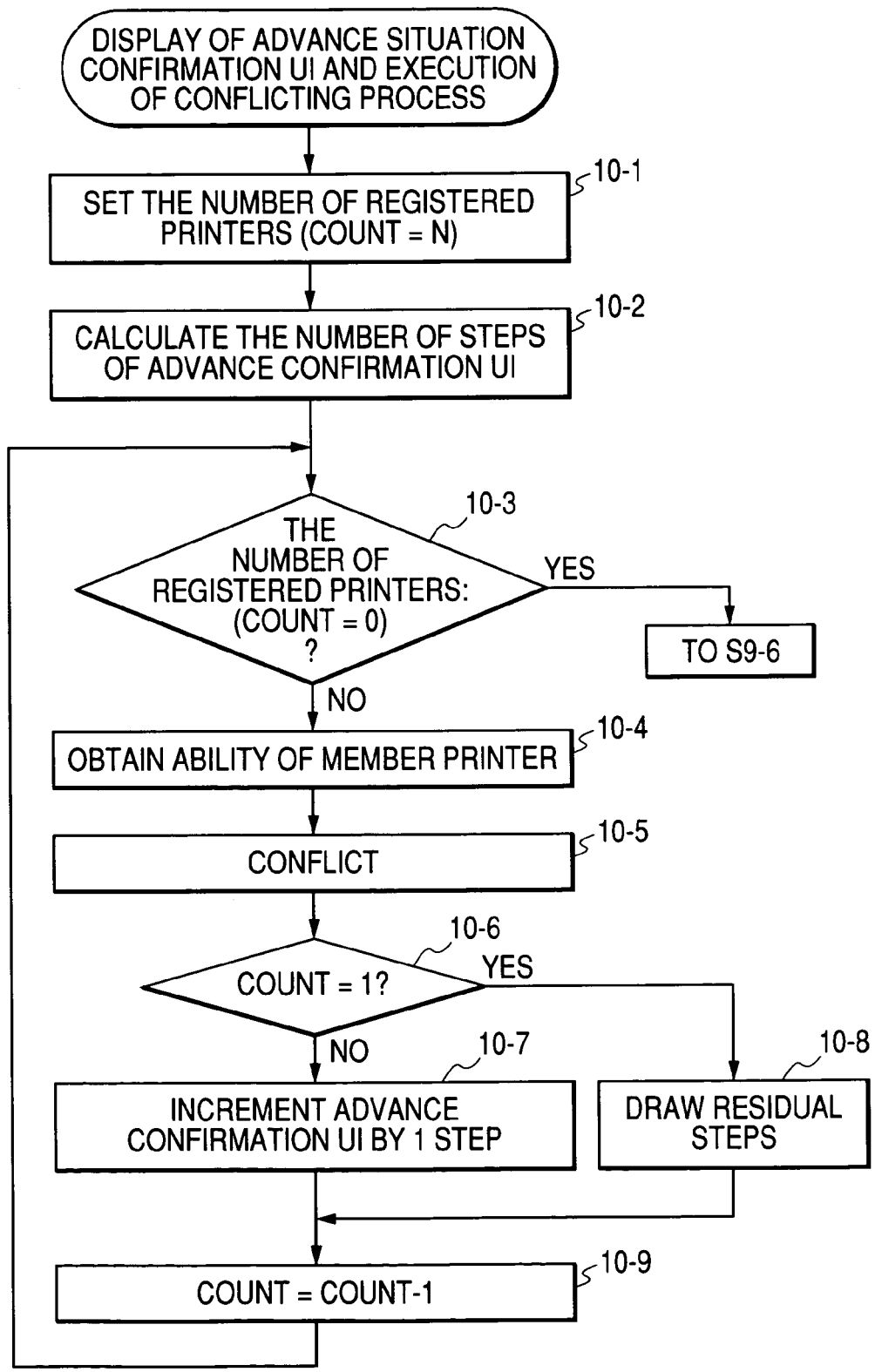
FIG. 10 is a flowchart for a conflicting process and an advance situation confirmation UI displaying process.

FIG. 10 is a flowchart showing a detailed process in step 9-4 and corresponds to the steps of executing the conflicting process and displaying the advance situation confirmation UI.

The advance situation confirmation UI indicates the UI display which can visually confirm the advance situation of a preparation for displaying the group printer driver UI. Naturally, as a display format of the advance situation, it can be displayed by a physical amount (length) such as an analog progress bar or by a percentage value as digital numerical value data. A form in which the progress bar is applied to the advance situation confirmation UI will now be described hereinbelow.

In step 10-1, the construction of the member printers (the number of registered member printers) is confirmed and the number of member printers obtained in step 9-2 described above is set into a counter variable (hereinafter, referred to as a COUNTER).

In step 10-2, a display step width of the advance situation confirmation UI is calculated. The display step width corresponds to a width of progress bar which is increased and updated in accordance with the progress of the conflicting process.

In the present invention, an attention is paid to the conflicting process of the function with a large load as a preparation of the group printer driver UI display.

Assuming that the length of progress bar on the advance situation confirmation UI regarding the state where the conflicting processes for all of the member printers have been finished is equal to 100, the display step width (updating width) which is updated each time the conflicting process for one member printer is finished is calculated as follows.

Display step width=100/(the number of registered member printers)

The length of progress bar corresponding to the value "100" mentioned above is actually equal to a length of 100 pixels in the display means.

In step 10-3, whether the COUNTER set in step 10-1 is equal to 0 or not is discriminated. If it is determined that the COUNTER is equal to 0, the processing routine advances to step 9-6. If NO, step 10-4 follows.

In step 10-4, ability of the member printer is obtained and the ability of the member printer which is specified on the basis of the identification ID of each member printer obtained in step 9-2 is read out. At this time, only common setting items are obtained and read out from the member printers whose functions are uncontrollable. The common setting items and the expansion setting items are obtained and read out from the member printers whose functions are controllable.

In step 10-5, a process for calculating a matching degree showing how to reflect the ability of each member printer obtained in step 10-4 to the group printer driver UI is executed. Details of the process in step 10-5 for obtaining the matching degree will be described with reference to FIG. 11.

In the invention, it is assumed that a series of processes in steps 10-1 to 10-9 which is executed with respect to each member printer is called a conflicting process. Actually, the processing time of step 10-4 is longest and, substantially, the updating of the advance situation confirmation UI in steps 10-7 and 10-8 is executed at timing when the process in step 10-4 is finished.

Figure 11:
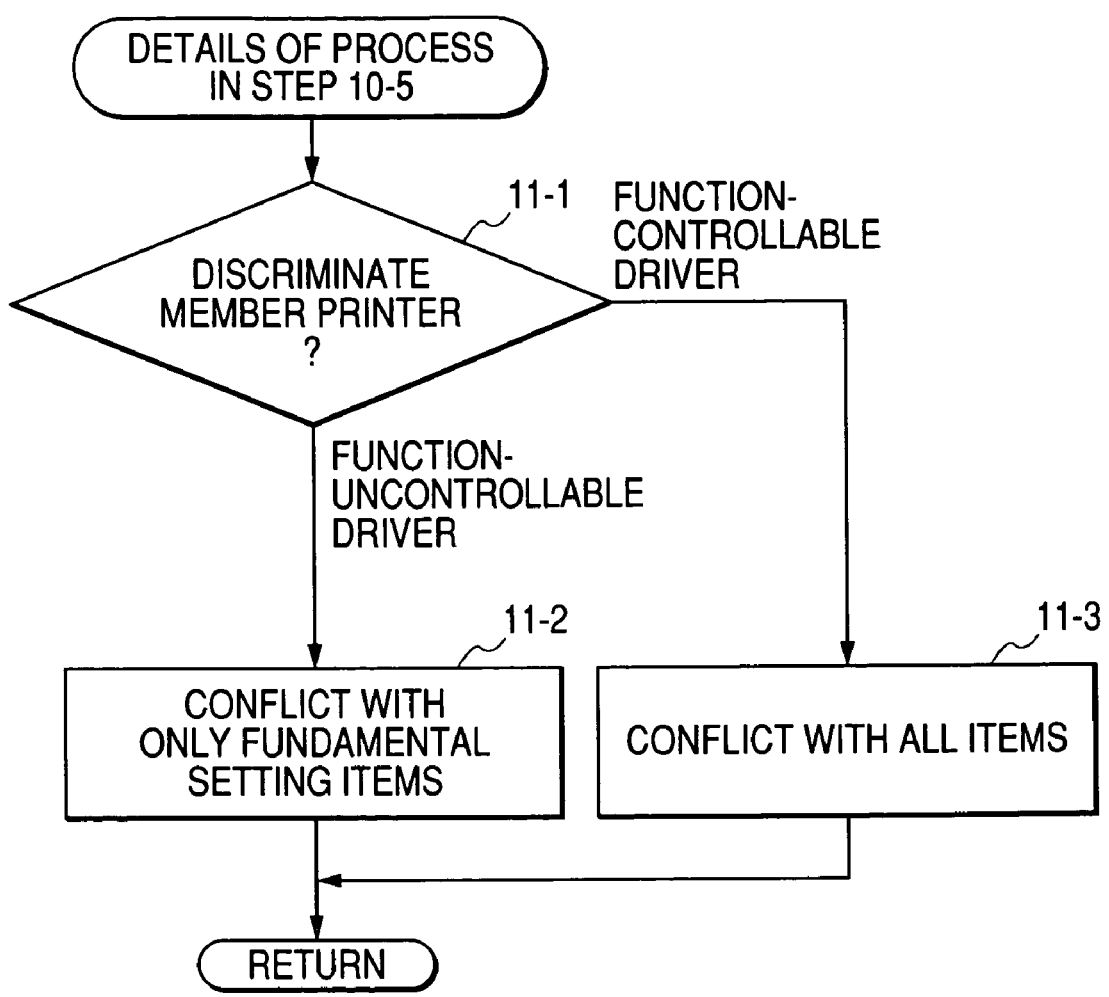
FIG. 11 is a flowchart for discriminating a group member printer driver conflict.

In step 11-1 in FIG. 11, whether the member printer driver obtained in step 9-2 is a "function-controllable driver" whose function can be obtained up to an expansion area portion of the driver setting information or another "function-uncontrollable driver" is discriminated. If it is the "function-controllable driver", step 11-3 follows. If it is the "function-uncontrollable driver", step 11-2 follows.

In the case of the function-controllable driver, the functions of the common setting items and the expansion setting items are examined. In the case of the function-uncontrollable driver, only the common setting items are examined.

FIG. 15 is a diagram showing a correspondence among the common setting items, the expansion setting items, and the setting items. In the present invention, the common setting items are classified and specified as items existing in the common setting area and the expansion setting items are classified and specified as items existing in the expansion setting area. Although there is a case where the classifications of the setting items differ or a case where there is a change in settable items in dependence on a difference of the OSs for making the print job control system operative, naturally, the UI control flow of the invention is effective.

FIG. 15 will be described further in detail. The item of each function which is specified in the common setting items corresponds to the item which can be inquired by the print control program through the OS irrespective of the difference of each of the plurality of member printer drivers. On the other hand, in the case of the item of each function corresponding to the expansion setting items, such an operation that the print control program inquires through the OS, like a common setting item, is not always guaranteed. The expansion setting items correspond to such a situation that the providing source side of each printer driver uniquely specifies the inquiring mechanism. For the group printer driver, the printer driver which cannot use the inquiry about the expansion setting items is also called a "function-uncontrollable driver".

The conflicting process of the functions will now be specifically explained. According to the conflicting process of the functions, driver identification information is obtained from each of the member printer drivers as targets of the group printer, the information of the functions specified in the common setting area and the expansion setting area is obtained, the "presence" or "absence" of the function of each setting item obtained from the member printer driver is discriminated, if the functions exist in all of the target member printer drivers, these functions are handled as settable items by the group printer driver UI, and if even one member printer driver without the functions exists, the relevant items are handled as unsettable items.

A printer driver A in FIG. 16A shows the group printer driver. Printer drivers B, C, and D indicate the member printer drivers constructing the group printer driver. "Yes"/"No" in the table indicates whether each member printer driver supports the booklet printing function, stapling printing function, and punching function or not.

When an attention is paid to the booklet printing function, although the drivers A and B have the booklet printing function, since the driver C does not have the booklet printing function, the item of the booklet printing function of the group printer driver A is set to "No".

Similarly, since all of the member printer drivers B, C, and D have the stapling function, the item of the stapling function of the group printer driver A is set to "Yes". Since none of the member printer drivers B, C, and D has the punching function, the item of the punching function of the group printer driver A is set to "No".

Although FIG. 16A has been described without distinguishing the common setting items from the expansion setting items in particular, actually, there are executed such processes that if the function-uncontrollable driver is included in the construction of the member printer driver, the setting items as targets of the conflicting process (flowchart of FIG. 10) are set to only the common setting items, and if the member printers are constructed only by the function-controllable drivers, the setting items as targets of the conflicting process are set to the common setting items and the expansion setting items. FIG. 16B shows a relation between a type construction of the member printers and the items as targets of the conflicting process. The relation between the type construction of the member printers and the items as targets of the conflicting process can be also set as shown in FIG. 16C.

The state where the OR is calculated with respect to the expansion setting items in FIG. 15 is shown in FIG. 16A. FIG. 16B shows the conflicting process in the case where the member printers are constructed only by the "function-controllable drivers". FIG. 16C shows the conflicting process which is executed in the case where at least one "function-controllable driver" is included in the member printers.

Returning to the explanation of FIG. 10, in step 10-6, the COUNTER variable set in step 10-1 is discriminated. If the COUNTER is not equal to 1, step 10-7 follows and the advance situation of the process is progressed in accordance with the display step width calculated in step 10-2. When the COUNTER is equal to 1, step 10-8 follows and the advance situation of the process is progressed until the completion.

This process is provided because if the process is displayed by (display step width)×(the number of registered member printers), a fraction is caused by the arithmetic operation of the display step width in dependence of the number of member printers and, finally, there is a case where the process is not progressed until the completing step.

In step 10-9, "1" is subtracted from the COUNTER variable set in step 10-1. The processing routine is returned to step 10-3 and the conflicting process of the result of the conflicting process (OR calculation) as mentioned above and the function of the next member printer is executed again. The processes in steps 10-4 to 10-9 are repeated until the conflicting process is finished with respect to all of the member printers.

Figure 18:
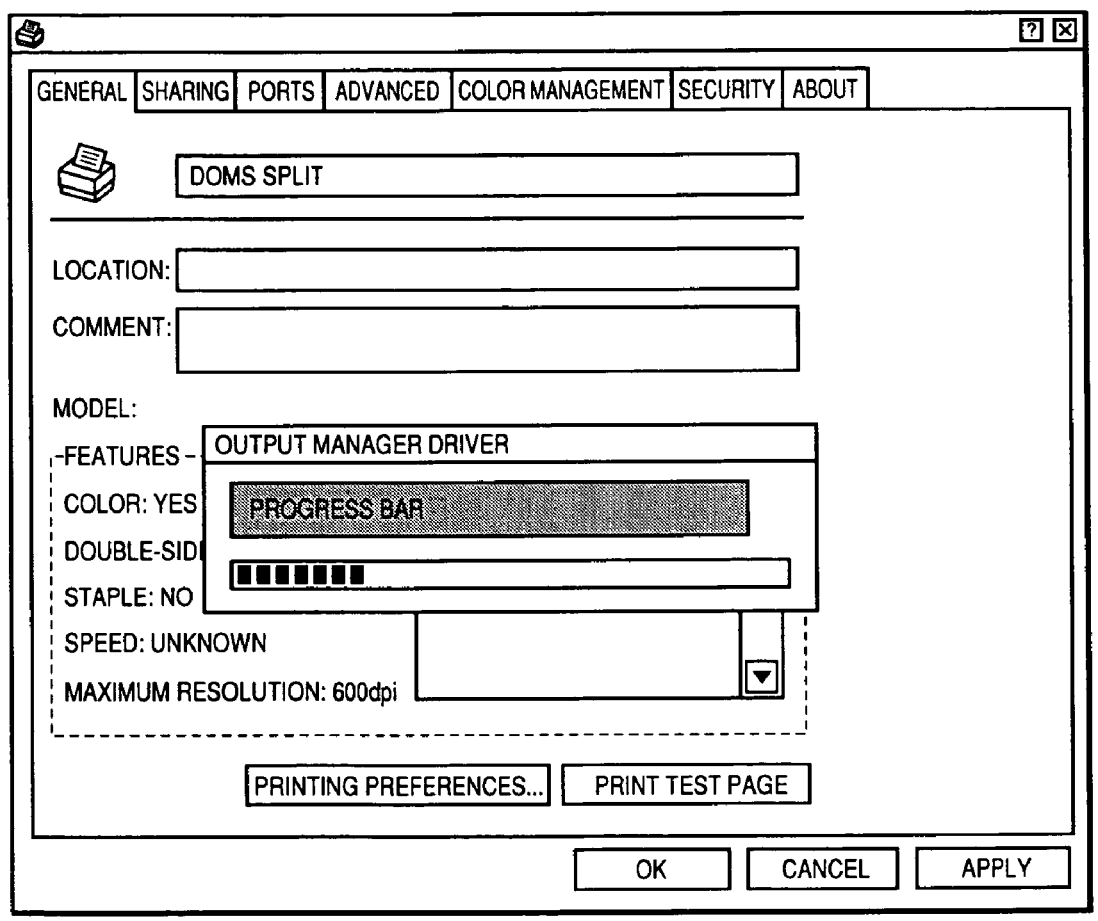
FIG. 18 shows a display example of a display screen of the advance situation confirmation UI.

When the processing routine is returned to step 10-3 through the foregoing steps, if the COUNTER variable is equal to 0, it is regarded that obtainment of the conflict information of the driver and the display of the advance situation confirmation UI have been completed, and step 9-6 follows. FIG. 18 shows a display state of the advance situation confirmation UI which is displayed in accordance with the flowchart of FIG. 10.

When the number of member printers constructing the group printer is smaller than the advance situation confirmation UI display discrimination number of printers in step 9-3, step 9-5 follows. In step 9-5, the conflict is performed without displaying the advance situation confirmation UI because the number of registered member printers is small and the UI is instantaneously displayed. When the number of constructing member printers is small, since a longer time is not necessary to present a print setting display screen of the group printer as compared with that in the case where it is large, the display of the advance situation confirmation UI is omitted. However, it is also possible to execute a process similar to that in step 9-4 and display the advance situation confirmation UI (FIG. 18).

Figure 12:
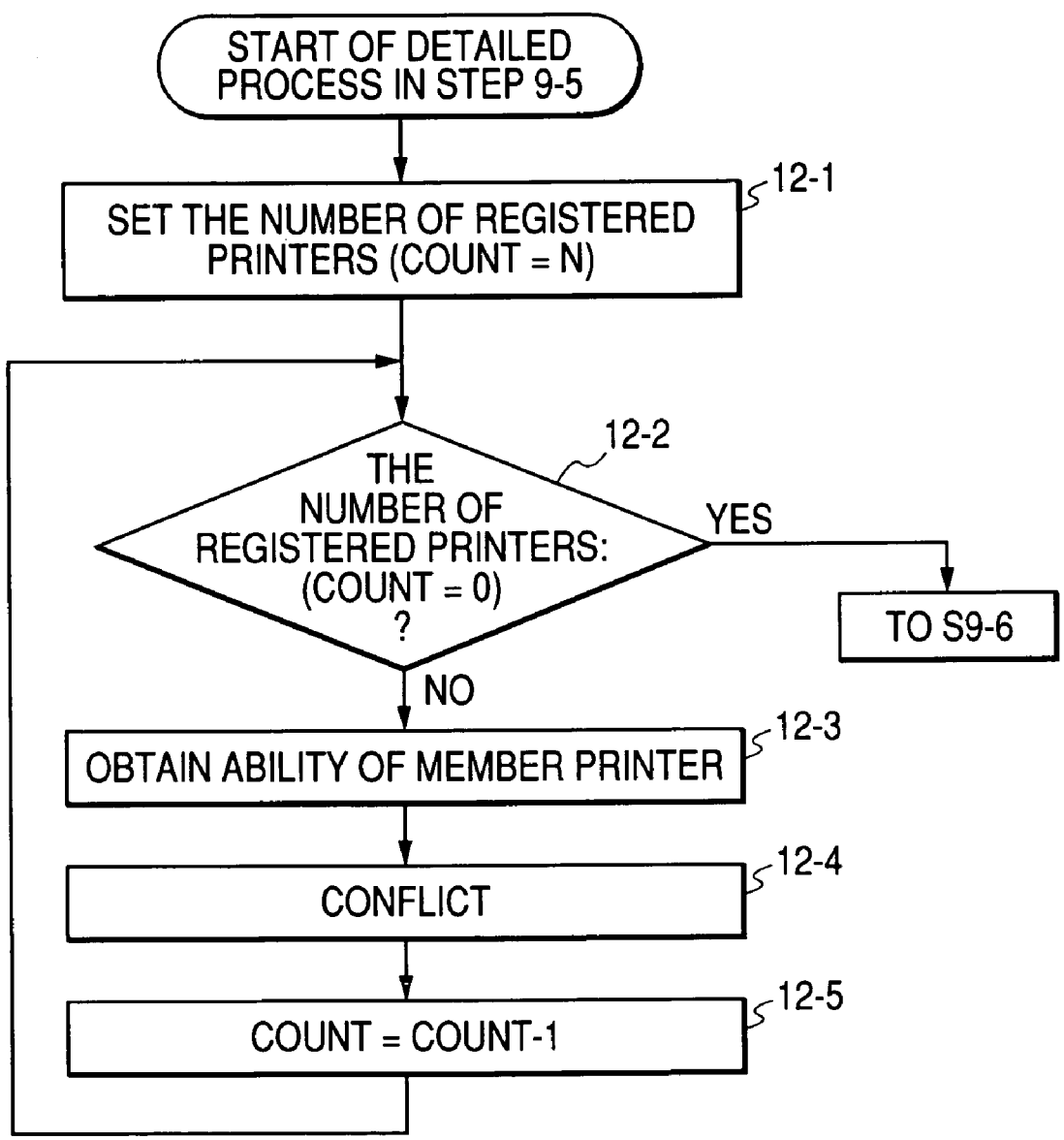
FIG. 12 is a flowchart for an advance situation confirmation UI non-display group member printer driver conflicting process.

FIG. 12 shows details in such a process. Processes in steps 12-1 to 12-5 correspond to those in the subsequent steps of FIG. 10. Since step 12-1 corresponds to step 10-1, step 12-2 corresponds to step 10-3, step 12-3 corresponds to step 10-4, step 12-4 corresponds to step 10-5, and step 12-5 corresponds to step 10-9, respectively, the details of those processes are not described here.

When the COUNTER variable is equal to 0 in step 12-2, it is regarded that the obtainment of the conflict information of the driver has been completed, and step 9-6 follows.

In step 9-6, the driver UI is displayed on the basis of the conflict information obtained in step 10-5. With respect to the items without the functions as a result of the conflict, such UI control that the items are gray-out displayed or not displayed is made so as to disable the setting to be made on the UI. With respect to the items having the functions, the UI control is not made.

Figure 17A:
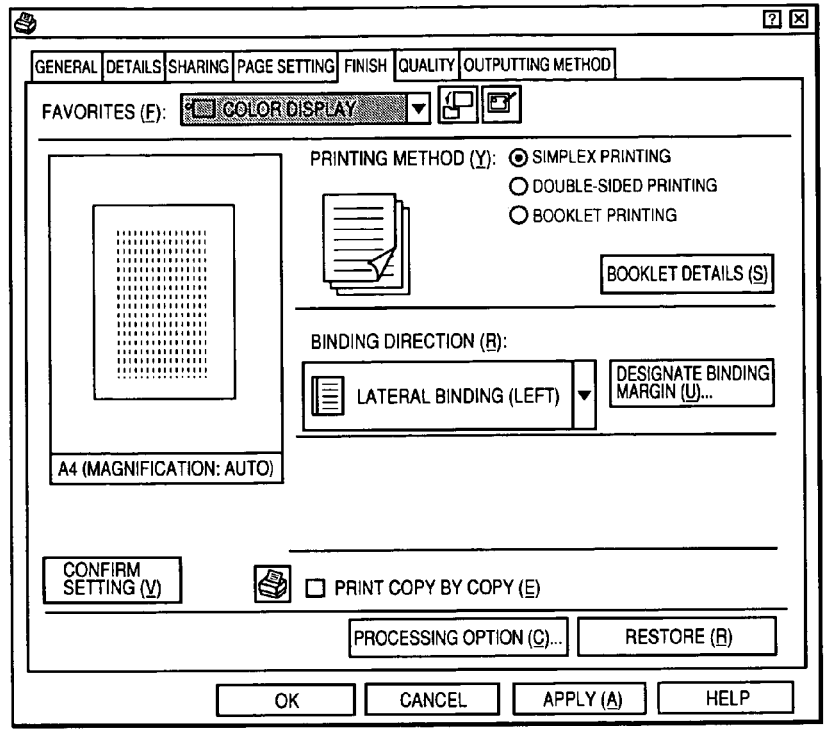
FIGS. 17A and 17B show display examples of a display screen of the group printer driver UI to which a result of the conflicting process has been reflected.
Figure 17B:
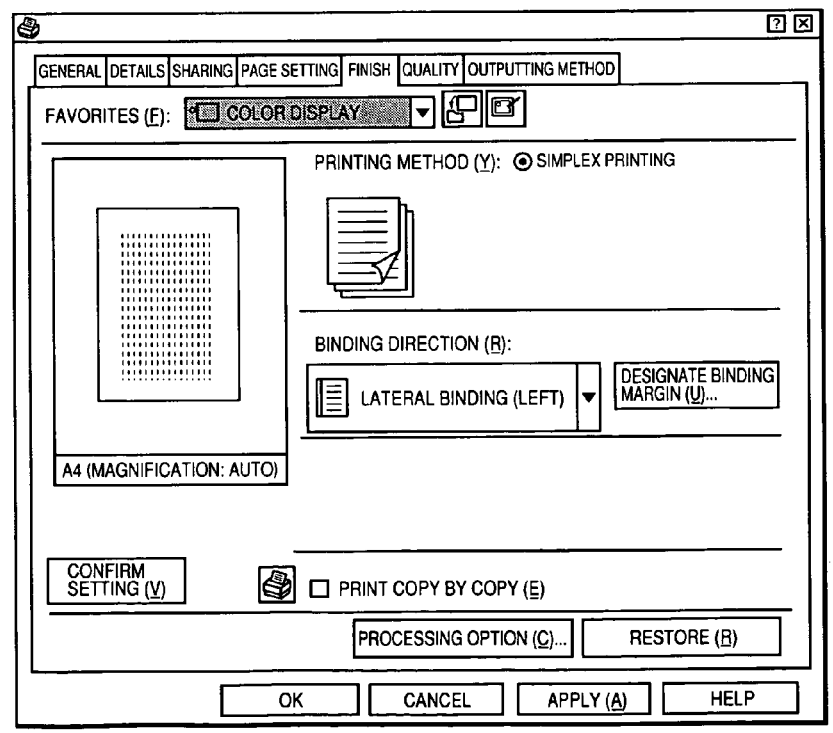

FIGS. 17A and 17B show schematic examples of the gray-out control and the non-display control of the UI. A dialog box of the double-sided printing and the booklet printing of the setting items is the portion where the UI control has been made. In this step, the UI control is made so that a combination which is impossible on the functions, such as designation of punching or stapling at the time when, for example, "booklet printing" has been designated by the user cannot be set, and the UI is displayed so as not to cause a contradiction in the setting items.

As described above, the process for obtaining the function of each printer or the like is presumed in order to use effectively enough the function of each printer and the advance situation confirmation UI according to the construction of the member printer drivers of the group printer driver is displayed instead of the mechanism which merely displays the dialog display screen of the virtual driver. Therefore, such a situation that the user feels anxious when it takes a few to tens of seconds to form the dialog display screen of the virtual driver can be prevented. Such a situation that the user misthinks that the print processing apparatus (personal computer or the like) has been frozen and reactivates the print processing apparatus can be prevented.

Such a technique that when a process for installing the application into the computer is executed, the user is notified of the advance situation of the installing process by the progress bar has conventionally been known. However, a processing amount of the installing process of the application has been predetermined. There is such a problem that according to the technique of notifying of the advance situation in association with it, the presentation of the advance situation based on the member printer construction which differs every virtual printer or every user cannot be accurately performed. According to the invention, since the updating of the advance situation confirmation UI based on the construction of the member printer driver is performed, it is possible to accurately notify the user of the advance situation of the conflicting process accompanied with the presentation of the setting display screen of the virtual printer.

Therefore, although it takes a time for preparation and the user feels anxious if the number of member printers is large when the group printer driver UI is displayed, by UI-displaying the advance situation, the internal processing advance situation can be grasped. Therefore, it is also possible to expect such effects that the user can feel a sense of security, the reliability to the system can be improved, and the waiting time which is necessary until the experience-like UI display is made can be shortened.

Second Embodiment

In the second embodiment, an example in which the processes shown in the flowchart of FIG. 9 described in the first embodiment has been further developed will be explained. Since a system construction in the second embodiment is similar to that in the mechanism in FIGS. 1 to 8 described in the first embodiment, its detailed description is omitted here.

Figure 13:
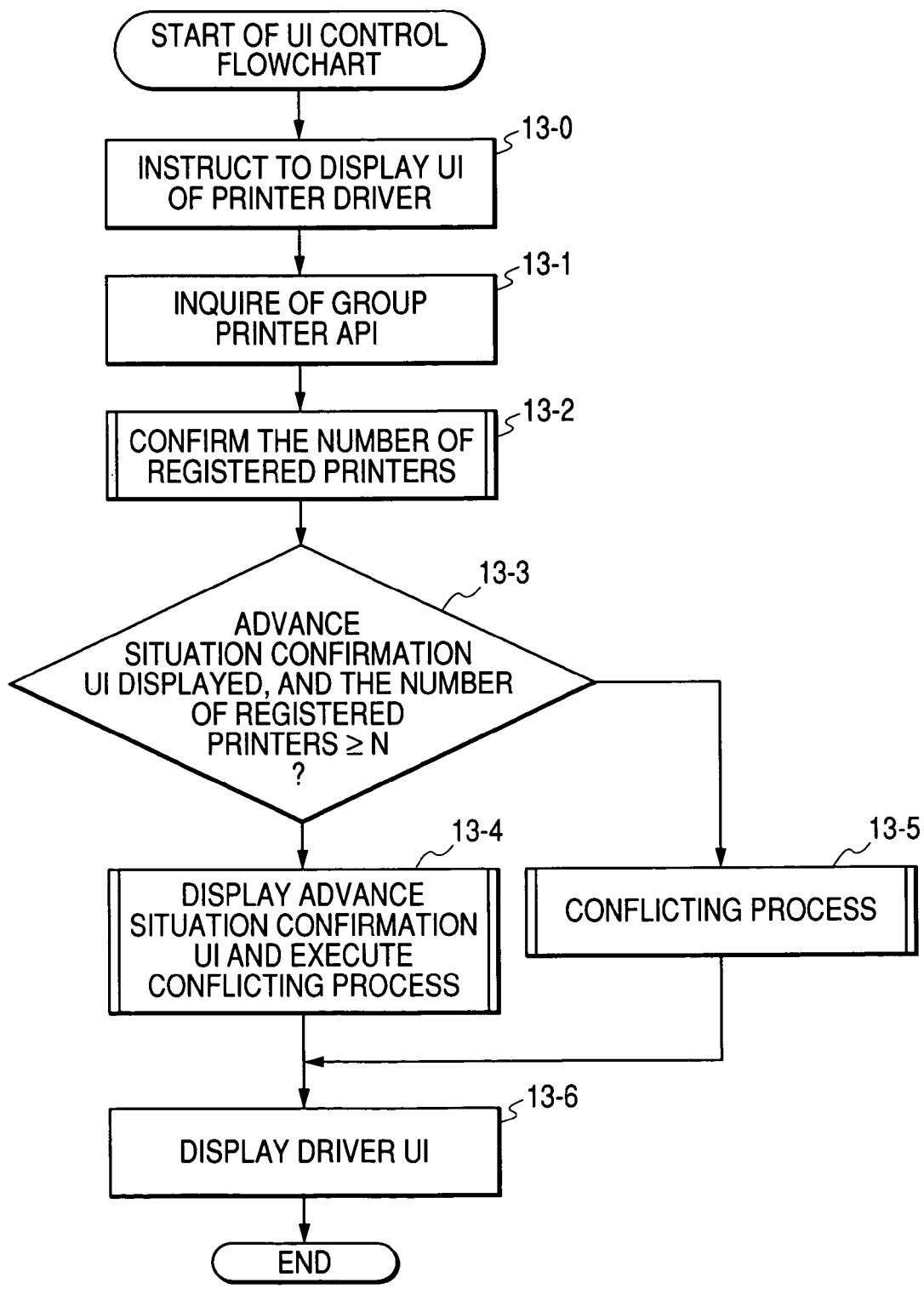
FIG. 13 is a basic flowchart for display of the group member printer driver UI.

FIG. 13 is a flowchart showing a UI control flow of the group printer driver obtained by adding steps 13-2 and 13-3 to the flow of FIG. 9: that is, in step 13-2 of confirming the number of registered printers, the method of counting the number of member printers is weighted (the weighted number of member printers) in accordance with the type of member printer; and further, in step 13-3, whether the advance situation confirmation UI is displayed or not is discriminated on the basis of the weighted number of member printers obtained in step 13-2 and ON/OFF of the advance situation confirmation UI display setting.

In step 13-0, when a UI displaying request is made by the application to the group printer driver, the processing routine advances to step 13-1.

In step 13-1, first, a process for inquiring about identifications IDs of the member printer drivers constructing the group printer driver is executed by using the print job control system API, the identifications IDs of all of the member printer drivers constructing the group printer are obtained, and the number of constructing member printers is calculated on the basis of the number of IDs. As described in step 9-2 in FIG. 9, the group printer driver obtains the number of member printers by using the API.

Figure 14:
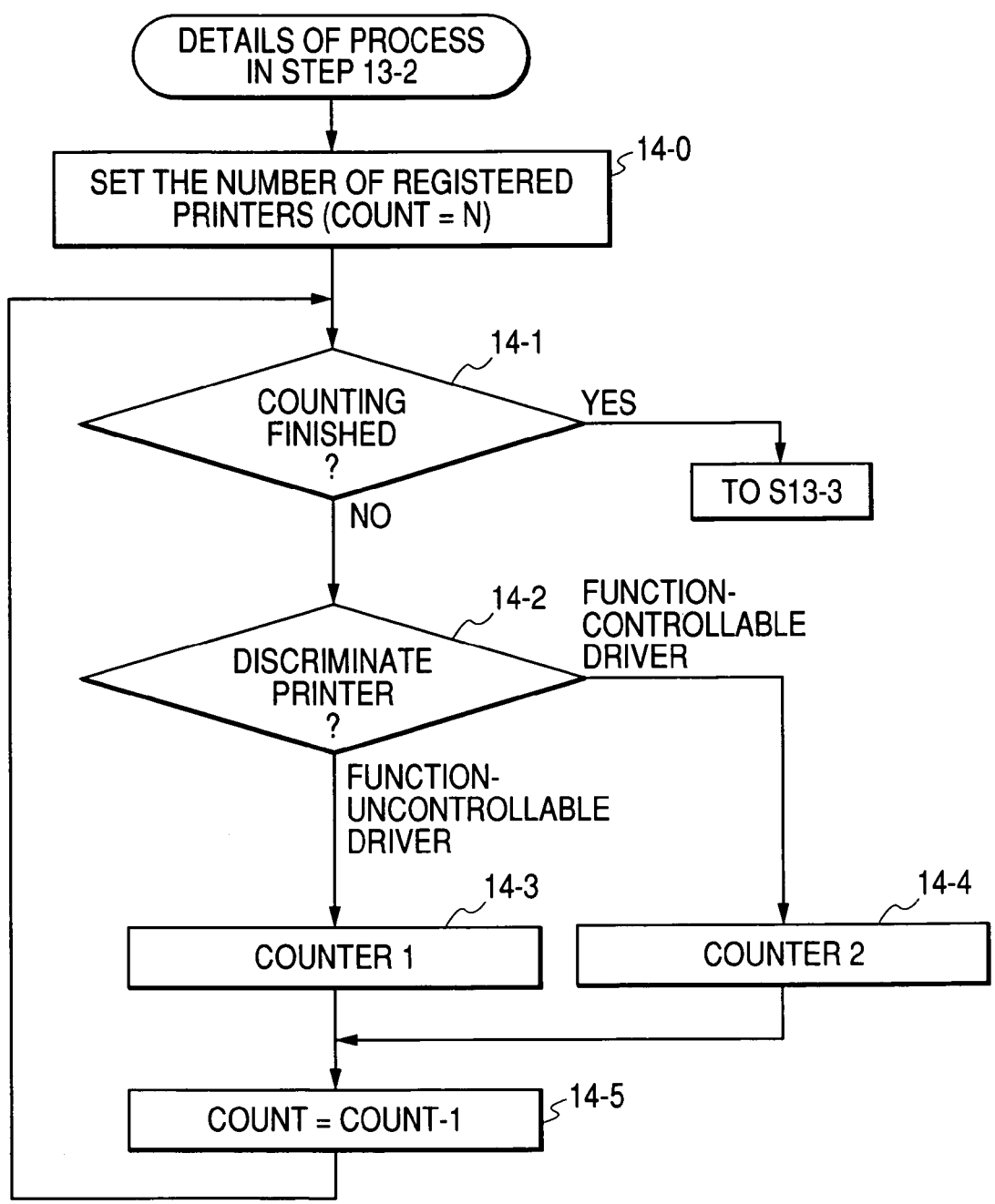
FIG. 14 is a flowchart for a process for weight-counting the number of registered member printers.

In step 13-2, the weighted number of member printers is counted and FIG. 14 shows its details.

FIG. 14 will now be described. In step 14-0, the number of registered member printers obtained in step 13-1 is set into the counter variable (hereinafter, referred to as a COUNTER). In step 14-1, whether the COUNTER set in step 14-0 is equal to 0 or not is discriminated. If it is equal to 0, the processing routine is finished and advances to step 13-3. If NO, step 14-2 follows.

In step 14-2, whether the member printer driver obtained in step 13-1 is the "function-controllable driver" whose function can be obtained up to the expansion area portion of the driver setting information or another "function-uncontrollable driver" is discriminated. If it is the "function-controllable driver", step 14-3 follows. If it is the "function-uncontrollable driver", step 14-4 follows. This discrimination is made to each of the member printers on the basis of the identification ID of the member printer driver corresponding to each member printer obtained in step 13-1 described above. For example, the printer driver name or the like is used as an identification ID of the member printer driver. A table in which the identifications IDs of the "function-controllable member printer drivers" have been recorded is held in the group printer driver in the state where such a table can be referred to. The member printer drivers whose identifications IDs are not recorded in this table are regarded as "function-uncontrollable member printer drivers".

In steps 14-3 and 14-4, the weighted number of member printers is counted. In step 14-3, the number of "function-controllable drivers" is counted. In those drivers, since the conflict target items comprise the basic setting items and the expansion setting items and the number of conflict target items is large, the count value is set to "1". In step 14-4, the number of "function-uncontrollable drivers" is counted. In those drivers, since the conflict target items comprise only the basic setting items, the count value is set to "0.5".

Although the embodiment has been described on the assumption that the count value is set to "0.5" in step S14-4, the invention is not limited to such an example but such a count value can be set to an arbitrary value which is smaller than the count value which is counted in step 14-3. For example, it is possible to construct in such a manner that the count value of the number of "function-controllable drivers" is set to 1, the count value of the number of "function-uncontrollable drivers" is set as a rate of the number of items of the "function-uncontrollable drivers" to the number of conflict items of the "function-controllable drivers", that is, (the number of basic setting items)/{(the number of basic setting items)+(the number of expansion setting items)} is calculated, and such a rate is used as a count value. The count values calculated in steps 14-3 and 14-4 are accumulated each time the processes in steps 14-2 to 14-5 are repeated. The accumulated count values are used as the number of member printers that is referred to in step 13-3.

In step 14-5, "1" is subtracted from the COUNTER variable set in step 14-0.

When the processing routine is returned to step 14-1 through the above-mentioned processing steps, if the COUNTER variable is equal to 0, it is regarded that the counting operation of the weighted number of member printers has been finished, and step 13-3 follows.

In step 13-3, whether the advance situation confirmation UI is displayed or not is discriminated. As discriminating conditions, it is discriminated by checking whether or not the number of printers in which the display of the advance situation confirmation UI has been determined is smaller than the weighted number of member printers obtained in step 13-2 and whether the advance situation confirmation UI display setting is ON or OFF. However, if the discriminating conditions are not set by the group printer driver UI in the situation just after the installation, the program controls the UI display on the basis of the number of printers in which the display of the advance situation confirmation UI has been determined and ON/OFF of the advance situation confirmation UI display setting which have previously been defined.

If the advance situation confirmation UI display setting is ON and the weighted number of member printers obtained in step 13-2 is equal to or larger than the number of printers in which the display of the advance situation confirmation UI has been determined as a result of comparison between them, the processing routine advances to step 13-4. If NO, step 13-5 follows. Since details of the process in step 13-4 are similar to the processes based on FIGS. 10 and 11 described above, its description is omitted here.

If the number of constructing group printers is smaller than the number of registered printers in which the display of the advance situation confirmation UI has been determined in step 13-3, step 13-5 follows. A detailed process in step 13-5 is similar to the processes described in the flowchart of FIG. 12. When the COUNTER variable is equal to 0 in step 12-2, it is regarded that the obtainment of the conflict information of the driver has been completed, and the processing routine advances to step 13-6.

In step 13-6, the group printer driver UI is displayed. In step 13-6, the following UI control is made. That is, with respect to the items of the member printer drivers without the functions as a result of the calculation of the OR of the functions of a plurality of member printer drivers based on the flowcharts described above, the setting input column is gray-out displayed or not displayed so that the setting cannot be made on the group printer driver UI, and with respect to the items having the functions, the setting input column is made active.

In the display control of the group printer driver UI, the UI control is made with regard to the input column of the setting items so that such a combination which is impossible on the functions that, for example, the punching setting or the stapling setting can be designated when the "booklet printing" is designated by the user cannot be set.

FIGS. 17A and 17B show examples of the UI control result. FIG. 17A shows the example in which the setting items are gray-out displayed as a result of the conflicting process mentioned above. FIG. 17B shows the example in which the setting items are not displayed as a result of the conflicting process mentioned above.

The embodiment has been described above on the assumption that the advance situation confirmation UI is automatically displayed. As conditions regarding the advance situation confirmation UI display in step 13-3, the setting of the number of printers to be displayed in which the display of the advance situation confirmation UI has been determined or the setting of ON/OFF of the advance situation confirmation UI display can be also performed through the group printer driver UI. The settings performed through the group printer driver UI are held in a non-volatile storing area of the hard disk (HD) or the like of the client PC and used when the group printer driver UI is displayed next time. Naturally, such a construction that the ON/OFF setting of the advance situation confirmation UI display is provided can be also similarly applied to the first embodiment.

By enabling ON/OFF of the advance situation confirmation UI display to be set, a setting in which the UI is not displayed in an environment in which the confirmation UI display is unnecessary can be realized. By weighting and counting the count value of the number of member printers in accordance with the type of member printers, precision for the display conditions of the advance situation confirmation UI display is improved, so that a frequency of the unnecessary UI display can be decreased. Consequently, the operability can be remarkably improved.

By enabling ON/OFF of the advance situation confirmation UI display to be set by the above processing steps, a setting in which the UI is not displayed in an environment in which the confirmation UI display is unnecessary can be realized. By weighting and counting the count value of the number of member printers in accordance with the type of member printers (function-controllable or function-uncontrollable), the precision for the display conditions of the advance situation confirmation UI display is improved, so that a frequency of the unnecessary UI display can be decreased. Consequently, the operability can be remarkably improved.

As described above, the process for obtaining the function of each printer or the like is presumed so as to use effectively enough the functions of the printers and the advance situation confirmation UI according to the construction of the member printers of the group printer driver is displayed instead of the mechanism for simply displaying the dialog display screen of the virtual driver. Therefore, for example, such a situation that when it takes a few to tens of seconds to form the dialog display screen of the virtual driver, the user will feel anxious can be prevented. Such a situation that the user misthinks that the print processing apparatus (personal computer or the like) has been frozen and reactivates the print processing apparatus can be prevented.

What is claimed is:

1. An information processing apparatus for controlling a print job using a virtual printer constructed by a plurality of member printers, comprising:
   receiving means for receiving a display request for a setting display screen of the virtual printer;
   conflicting means for executing a conflicting process based on each function of the plurality of member printers in response to the display request received by said receiving means;
   examining means for examining a construction of the member printers which construct the virtual printer, wherein the construction includes the number of the member printers and types of the member printers, and wherein the type of each member printer indicates whether the member printer has a function-controllable printer driver or a function-uncontrollable printer driver;
   counting means for executing a weight-counting process of the number of the member printers on the basis of the types of the member printers; and
   display control means for controlling said apparatus so as to visualize an advance situation of the conflicting process on the basis of the examination by said examining means and the weight-counting process executed by said counting means during the conflicting process executed by said conflicting means and for reflecting a result of the conflicting process to the setting display screen of the virtual printer after the conflicting process is executed.

2. An apparatus according to claim 1, wherein said examining means examines the number of member printers constructing said virtual printer and said display control means visualizes the advance situation of the conflicting process in accordance with a result showing that the number of member printers examined by said examining means is equal to or larger than a predetermined value.

3. An apparatus according to claim 2, further comprising obtaining means for obtaining an identification ID of a printer driver by using an API from a member printer driver corresponding to the member printer associated with the virtual printer,
   and wherein said examining means discriminates the number of member printers on the basis of the identification ID of the printer driver obtained by said obtaining means.

4. An apparatus according to claim 1, wherein said display control means updates a display of the visualized advance situation of said conflicting process in accordance with an end of the conflicting process to a predetermined member printer.

5. An apparatus according to claim 4, wherein the conflicting process to said predetermined member printer includes obtainment of function information from the member printer.

6. An apparatus according to claim 1, further comprising setting means for performing setting based on an input regarding whether the visualization of the advance situation of said conflicting process is executed or not.

7. An information processing method in an information processing apparatus for controlling a print job using a virtual printer constructed by a plurality of member printers, comprising:
   a receiving step of receiving a display request for a setting display screen of the virtual printer;
   a conflicting step of executing a conflicting process based on each function of the plurality of member printers in response to the display request received by said receiving step;
   an examining step of examining a construction of the member printers which construct the virtual printers, wherein the construction includes the number of the member printers and types of the member printers, and wherein the type of each member printer indicates whether the member printer has a function-controllable printer driver or a function-uncontrollable printer drive;
   a counting step for executing a weight-counting process of the number of the member printers on the basis of the types of the member printers; and
   a display control step to control the information processing so as to visualize an advance situation of the conflicting process on the basis of the examination in said examining step and the weight-counting process executed in said counting step during the conflicting process executed by said conflicting means and for reflecting a result of the conflicting process to the setting display screen of the virtual printer after the conflicting process is executed.

8. A method according to claim 7, wherein in said examining step, the number of member printers constructing said virtual printer is examined and in said display control step, the advance situation of the conflicting process is visualized in accordance with a result showing that the number of member printers examined in said examining step is equal to or larger than a predetermined value.

9. A method according to claim 8, further comprising an obtaining step of obtaining an identification ID of a printer driver by using an API from a member printer driver corresponding to the member printer associated with the virtual printer,
   and wherein in said examining step, the number of member printers is discriminated on the basis of the identification ID of the printer driver obtained in said obtaining step.

10. A method according to claim 7, wherein in said display control step, a display of the visualized advance situation of said conflicting process is updated in accordance with an end of the conflicting process to a predetermined member printer.

11. A method according to claim 10, wherein the conflicting process to said predetermined member printer includes obtainment of function information from the member printer.

12. A method according to claim 7, further comprising a setting step of performing setting, through a setting unit, based on an input regarding whether the visualization of the advance situation of said conflicting process is executed or not.

13. A computer readable storage medium having a program stored thereon for execution by an information processing apparatus for controlling a print job using a virtual printer constructed by a plurality of member printers, said program comprising:
- a receiving step of receiving a display request for a setting display screen of the virtual printer;
- a conflicting step of executing a conflicting process based on each function of the plurality of member printers in response to the display request received by said receiving step;
- an examining step of examining a construction of the member printers which construct the virtual printers, wherein the construction includes the number of the member printers and types of the member printers, and wherein the type of each member printer indicates whether the member printer has a function-controllable printer driver or a function-uncontrollable printer driver;
- a counting step for executing a weight-counting process of the number of the member printers on the basis of the types of the member printers; and
- a display control step to control the information processing so as to visualize an advance situation of the conflicting process on the basis of the examination in said examining step and the weight-counting process executed in said counting step during the conflicting process executed by said conflicting means and for reflecting a result of the conflicting process to the setting display screen of the virtual printer after the conflicting process is executed.

14. A program according to claim 13, wherein in said examining step, the number of member printers constructing said virtual printer is examined and in said display control step, the advance situation of the conflicting process is visualized in accordance with a result showing that the number of member printers examined in said examining step is equal to or larger than a predetermined value.

15. A program according to claim 14, further comprising an obtaining step of obtaining an identification ID of a printer driver by using an API from a member printer driver corresponding to the member printer associated with the virtual printer,
and wherein in said examining step, the number of member printers is discriminated on the basis of the identification ID of the printer driver obtained in said obtaining step.

16. A program according to claim 13, wherein in said display control step, a display of the visualized advance situation of said conflicting process is updated in accordance with an end of the conflicting process to a predetermined member printer.

17. A program according to claim 16, wherein the conflicting process to said predetermined member printer includes obtainment of function information from the member printer.

18. A program according to claim 13, further comprising a setting step of performing setting, through a setting unit, based on an input regarding whether the visualization of the advance situation of said conflicting process is executed or not.

* * * * *